United States Patent
Hotta et al.

(10) Patent No.: US 8,533,334 B2
(45) Date of Patent: Sep. 10, 2013

(54) MESSAGE BINDING PROCESSING TECHNIQUE

(75) Inventors: Yuuji Hotta, Kawasaki (JP); Motoyuki Kawaba, Kawasaki (JP); Hidekazu Takahashi, Kawasaki (JP); Lilian Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/357,977

(22) Filed: Jan. 22, 2009

(65) Prior Publication Data

US 2009/0292810 A1 Nov. 26, 2009

(30) Foreign Application Priority Data

May 23, 2008 (JP) .................................. 2008-135002

(51) Int. Cl.
*G06F 15/173* (2006.01)

(52) U.S. Cl.
USPC ............ 709/226; 709/232; 718/101; 719/314

(58) Field of Classification Search
USPC .......... 709/201, 226, 232; 719/314; 718/101
See application file for complete search history.

(56) References Cited

U.S. PATENT DOCUMENTS

| | | | | |
|---|---|---|---|---|
| 6,226,377 B1 * | 5/2001 | Donaghue, Jr. | .......... | 379/265.13 |
| 6,272,515 B1 * | 8/2001 | Fouquet | ......................... | 718/101 |
| 6,848,109 B1 * | 1/2005 | Kuhn | .............. | 719/315 |
| 6,996,130 B2 * | 2/2006 | Ohashi et al. | ................. | 370/497 |
| 7,269,737 B2 * | 9/2007 | Robinson | ...................... | 713/186 |
| 7,711,805 B1 * | 5/2010 | Dale | .............................. | 709/223 |
| 7,788,370 B2 | 8/2010 | Yugami | | |
| 2005/0265362 A1 | 12/2005 | Kawashima et al. | | |
| 2007/0066281 A1 * | 3/2007 | Savinen et al. | ............ | 455/412.1 |

FOREIGN PATENT DOCUMENTS

| | | |
|---|---|---|
| JP | A 5-61697 | 3/1993 |
| JP | A 11-53323 | 2/1999 |
| JP | 2004-530182 | 9/2004 |
| JP | 2005-071031 | 3/2005 |
| JP | 2005-309519 | 11/2005 |
| JP | 2007-304647 | 11/2007 |
| WO | WO-02/054224 | 7/2002 |

OTHER PUBLICATIONS

"Japanese Office Action" mailed by JPO and corresponding to Japanese application No. 2008-135002 on Apr. 24, 2012, with English translation.

* cited by examiner

*Primary Examiner* — David Lazaro
*Assistant Examiner* — Marie Georges Henry
(74) *Attorney, Agent, or Firm* — Fujitsu Patent Center (57) ABSTRACT

An apparatus has a unit that receives plural messages, which belong to plural transactions and respectively have a pertinent transaction identifier, in an indefinite order; plural processors each having a queue storing the messages belonging to a transaction in charge, and outputting, after the messages belonging to one of the transactions in charge have become complete, the complete messages in the queue to a message processing unit; an allocation unit that outputs the received message to one of the plural processors, wherein one of the processors is identified based on the transaction identifier of the received message and an allocation rule predetermined for the transaction identifier; and a change unit that changes the allocation rule when activating or stopping the processor. When the change unit changes the allocation rule, each of the processors outputs at least messages for which re-allocation is necessary to the allocation unit.

5 Claims, 9 Drawing Sheets

FIG.1 msg2d
msg2e
msg2f
msg1a
msg1b
msg1c
msg2a
msg2b
msg2c
msg1d
msg1e
msg1f
TIME

FIG.2

| TRANSACTION 1 | TRANSACTION 2 |
|---|---|
| msg1a | msg2a |
| msg1b | msg2b |
| msg1c | msg2c |
| msg1d | msg2d |
| msg1e | msg2e |
| msg1f | msg2f |

MESSAGE BINDING PROCESSING TECHNIQUE

CROSS-REFERENCE TO RELATED APPLICATIONS

This application is based upon and claims the benefit of priority of the prior Japanese Patent Application No. 2008-135002, filed on May 23, 2008, the entire contents of which are incorporated herein by reference.

FIELD

The embodiments herein relates to a technique enabling a binding processing of messages to be parallelized.

BACKGROUND

Figure 1:
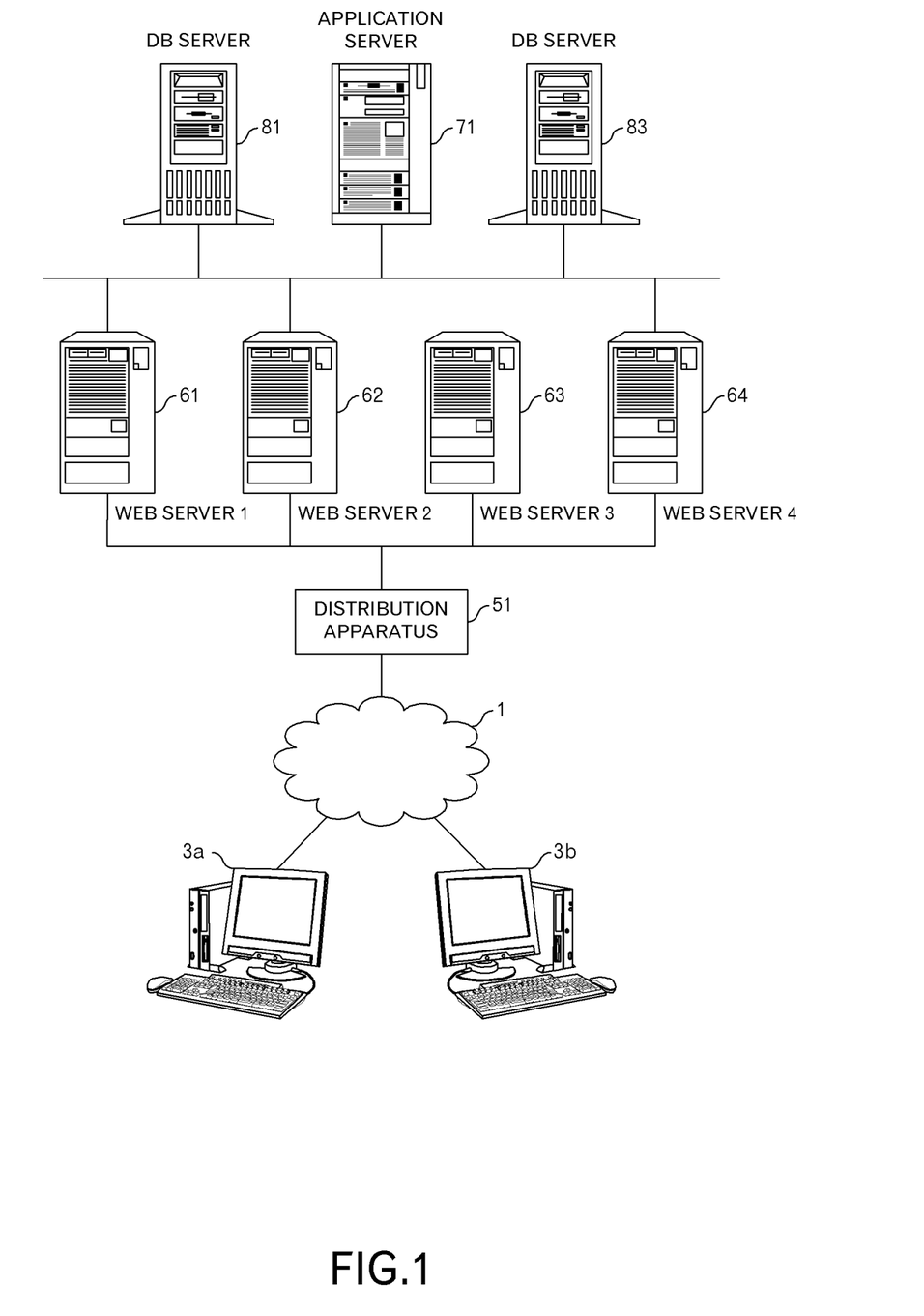
FIG. 1 is a diagram depicting an example of a conventional multi-layered system.

For example, in a system that messages are exchanged among servers in plural layers, such as an electronic commerce system, the parallel processing using plural servers is mandatory in order to a huge amount of messages at high speed. For example, FIG. 1 depicts an example of the system. Plural user terminals 3a to 3b are connected to a network 1, and furthermore, plural Web servers 61 to 64 are also connected through a distribution apparatus 51 that allocates a request from the user terminals 3a to 3b to one of the Web servers in order to realize the load distribution, to the network 1. The Web servers 61 to 64 are further connected to one or plural application servers 71 and/or one or plural DB server 81 and 83 and/or the like in the background. In such a system, for each request received by the Web servers 61 to 64, the Web server in charge of the request requests the application server 71 to execute a processing necessary for the request and obtains the processing result, and further requests the DB servers 81 and/or 83 to execute a processing to refer to and/or update the DB, which is necessary for the request, and obtains the processing results. Thus, the processing necessary for the request is carried out by exchanging plural requests among the servers.

Incidentally, the requests necessary for one message from the user terminal are recognized as one transaction by keywords and the like included in the message. For example, it is assumed that following messages exist:
msg1a (TagA=10, ...)
msg1b (TagA=10, ...)
msg1c (TagA=10, TagB=X, ...)
msg1d (TagB=X, ...)

In such a case, because msg1a, msg1b and msg1c have the same tag TagA and the values of the TagA are the same, it is possible to recognize them as the messages relating to the same transaction. On the other hand, because msd1d does not have TagA, it is judged in this viewpoint that msd1d is not a message relating to the same transaction as that of msg1a and the like. However, because msd1d and msg1c have the common tag TagB and the values "X" of TagB are the same, it can be judged that msg1c and msd1d are messages relating to the same transaction. Thus, because a message group relating to TagA and a message group relating to TagB have an overlapping message, the aforementioned msg1a to msd1d can be identified as messages relating to the same transaction. In this application, it is presumed that such a technique to identifying messages relating to the same transaction already exists. Then, it is presumed that a transaction ID or data corresponding to the transaction ID such as keywords or a value of the tag is included in each message, and the belonging transaction is identified for each message by using the transaction ID or the data corresponding to the transaction ID. In this application, the transaction ID or the data corresponding to the transaction ID is generally called "transaction ID". In the aforementioned example, the value "10" of TagA may be used as the transaction ID.

Figure 2:
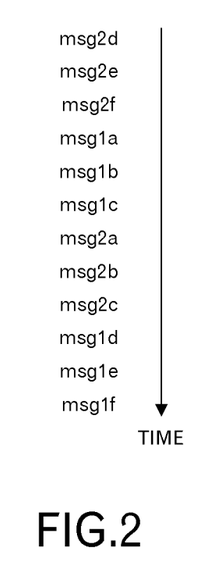
FIG. 2 is a diagram to explain appearance modes of messages.
Figure 3A:
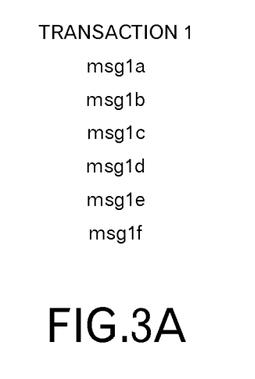
FIGS. 3A and 3B are diagrams to explain a message binding processing.
Figure 3B:
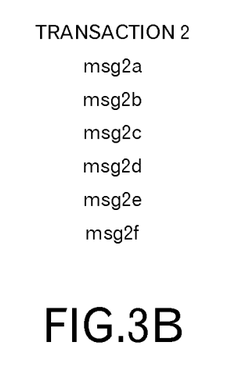

In order to monitor behaviors of such a system and/or analyze a request delay problem, a message binding processing is carried out. For example, in a case where two transactions exist and 6 messages a to f are included in the respective transactions, an order of the message appearance is not fixed as depicted in FIG. 2 (e.g. msg2d represents a fourth message in the transaction 2.). Namely, the messages belonging to two transactions do not appear separately, but are mixed, and the order of messages in one transaction may be exchanged. The message binding processing is a processing to group the messages as depicted in FIG. 2 into the respective transactions and further collect, for each transaction, the messages belonging to the transaction. Namely, as depicted in FIG. 3A, the messages msg1a to msg1f belonging to the transaction 1 are classified and collected, and as depicted in FIG. 3B, the messages msg2a to msg2f belonging to the transaction 2 are classified and collected.

Incidentally, in the distributed transaction processing system, a technique to hold data consistency when a recovery processing is failed in a processing side system exists. Specifically, a transaction allocation processor judges whether or not it is possible to process the transaction in this system to allocate the transaction to this system or other system, and the transaction execution controller controls the execution of the allocated transaction. A transaction processing controller issues a clear request of transfer information in mutual transfer information storage areas when the transaction is ended in the processing side system, and in order to guarantee a transaction processing when being activated again after the processing side system is down, a requester side system inquires the state of the transaction for the processing side system after the communication path is re-established, and re-transfers the transfer information, if necessary. However, any processing to mutually associate messages constituting a transaction is not carried out.

In addition, a technique to automatically carry out an appropriate processing for a failure exists. Specifically, flags corresponding to a normal completion and abnormal completion in a multiple processing execution state table stationed in a buffer memory are updated when starting execution of a user program in the first to n-th processing. In addition, a consecutive execution program has a function to set a time when the user would like to automatically recover, and always confirms the time by the system timer. At the set time, the consecutive execution program refers to the multiple processing execution state table. When the flag of the abnormal completion on the table is detected, the consecutive execution program identifies information of the abnormal completion to activate a recovery program and carry out an automatic recovery. Next, when the recovery program is completed, the flag of the abnormal completion in the multiple processing execution state table is written to the normal completion. In this technique, it is not possible to rapidly respond to the configuration change.

Because the processing load of the aforementioned message binding processing is high, parallelization may be considered. However, the simple parallelization has following problems.

Figure 4:
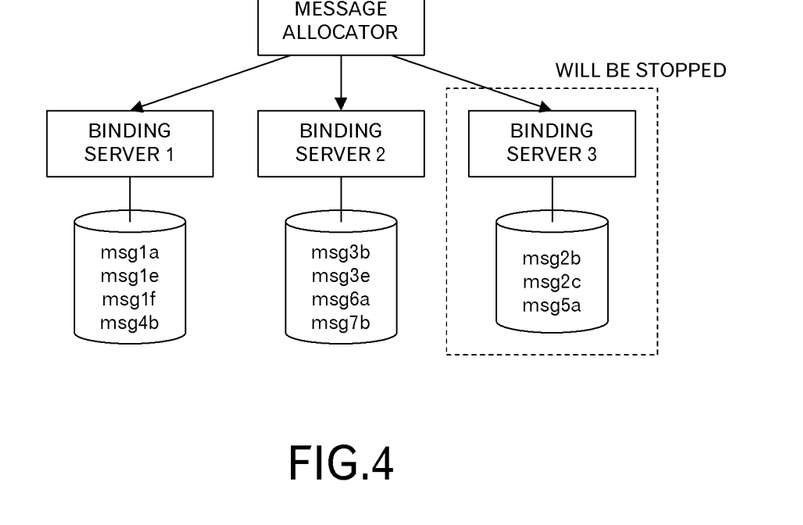
FIG. 4 is a diagram to explain problems in a conventional art.

For example, as depicted in FIG. 4, it is assumed that a message allocator allocates messages belonging to transactions 1 and 4 to a binding server 1 in charge of the transactions 1 and 4, messages belonging to transactions 3, 6 and 7 to a binding server 2 in charge of the transaction 3, 6, and 7, and messages belonging to transactions 2 and 5 to a binding server 3 in charge of the transaction 2 and 5. Here, when the binding server 3 is required to dynamically be stopped, the message allocator changes an allocation rule to allocate messages belonging to the transactions 2 and 5 to the binding server 1 or 2. However, msg2b, msg2c and msg5a held in the binding server 3 as depicted in FIG. 4 are discarded without being bound. Moreover, messages, which belong to the transactions 2 and 5 and appear after the allocation rule changed, are allocated to the binding server 1 or 2. However, the messages, which were allocated to the binding server 3 and were discarded, do not reach the binding servers 1 and 2 even if they wait receiving. Therefore, because of the time-out, the messages, which belong to the transactions 2 and 5 and appear after the allocation rule changed, will be discarded. Therefore, all of the messages belonging to the transactions 2 and 5 are discarded and are not used for the system analysis, because they are not complete.

In FIG. 4, an example of stopping the binding server is shown. However, similar situation occurs in the dynamic addition of the binding server. Namely, a case may occur, where the allocation rule in the message allocator is changed, and at least one of the binding servers is no longer responsible for the transaction for which the binding servers have been responsible. Then, a part of messages belonging to the transaction for which the binding servers are no longer responsible will be discarded because all of messages for the transaction are not completely received.

Thus, in order to carry out the message binding processing in parallel without leakage of the messages, it is necessary to allocate all messages for one transaction to one binding server. For this purpose, it is necessary to add or delete the binding server after stopping the entire system. This is not realistic. However, when dynamically stopping or adding the binding server without stopping the entire system, it is impossible to simply carry out the message binding processing without leakage of the messages during a predetermined period before and after the stopping or adding.

SUMMARY

Therefore, an object of this invention is to provide a technique enabling the message binding processing without the leakage of the messages, even when dynamically adding or stopping a server carrying out the message binding processing or the like.

A message binding processing apparatus has a receipt unit that receives a plurality of messages, which belong to a plurality of transactions and respectively have a pertinent transaction identifier, in an indefinite order; a plurality of binding processing units each having a queue storing the messages belonging to transactions in charge, and each outputting, after the messages belonging to one of the transactions in charge have become complete, the complete messages in the queue to a message processing unit; a message allocation unit that outputs the received message to one of the plurality of binding processing units, wherein one of the binding processing units is identified based on the transaction identifier of the received message and an allocation rule predetermined for the transaction identifier; and a configuration change unit that changes the allocation rule when activating or stopping the binding processing unit. Then, when the configuration change unit changes the allocation rule, each of the binding processing units outputs at least messages for which re-allocation is necessary among the messages stored in the queue to the message allocation unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 5:
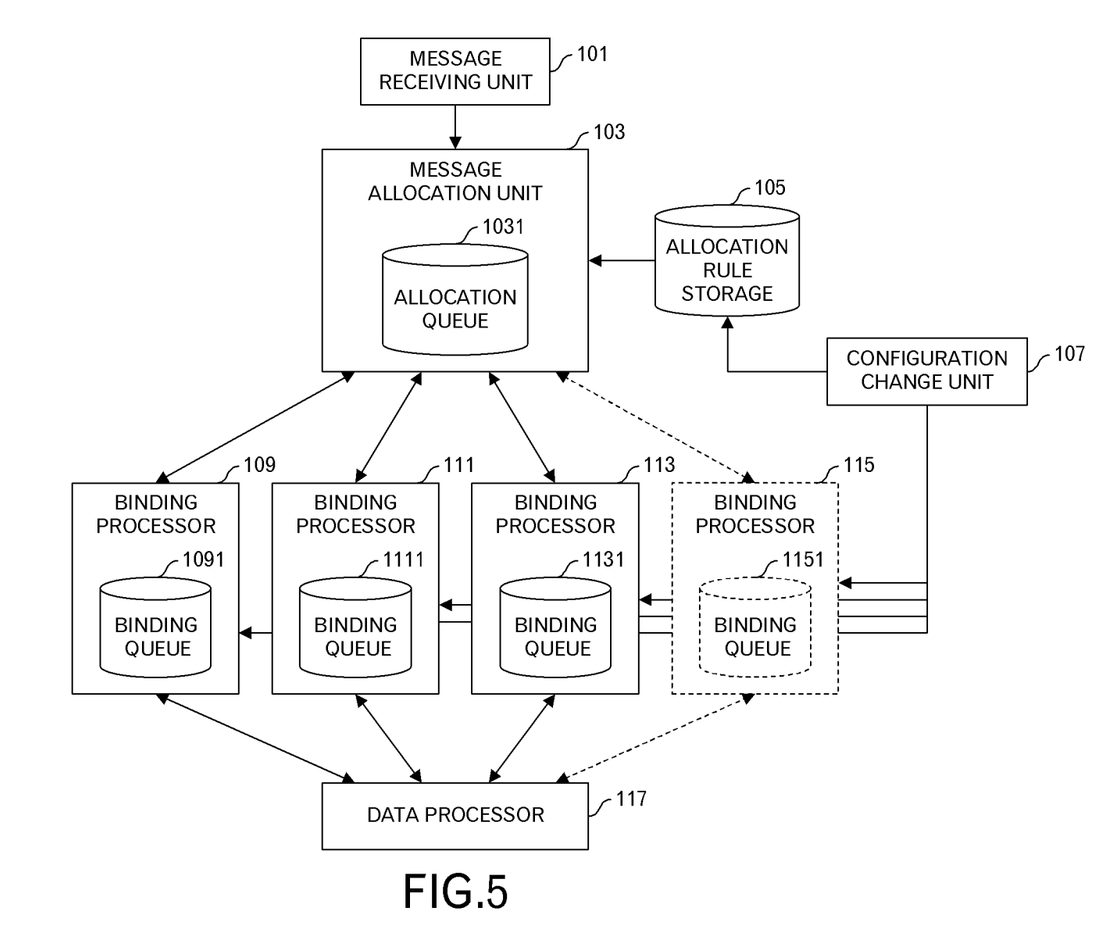
FIG. 5 is a functional block diagram of a message binding processing apparatus relating to embodiments.
Figure 6:
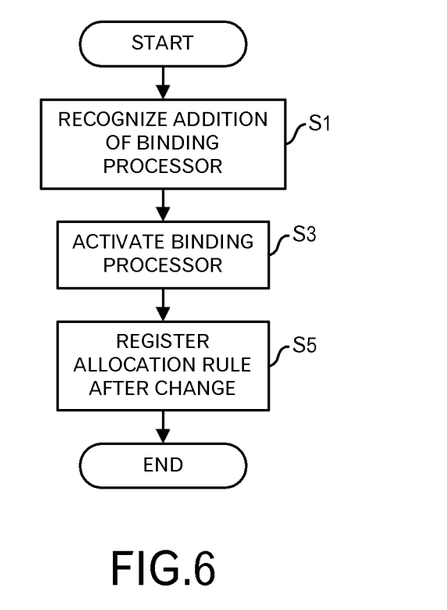
FIG. 6 is a diagram depicting a processing by a configuration change unit when a binding processing unit is added.

FIG. 5 depicts a system outline of a message binding processing apparatus relating to one embodiment. The message binding processing apparatus relating to this embodiment has a message receiving unit 101 that receives messages relating to respective transactions; a configuration change unit 107 that sets change of an allocation rule according to an instruction from a user or a schedule of adding or stopping a binding processor 109; an allocation rule storage 105 that stores data for the allocation rule set by the configuration change unit 107; a message allocation unit 103 that has an allocation queue 1031 temporarily storing messages received by the message receiving unit 101, and allocates messages stored in the allocation queue 103 to one binding processor in charge of the message, according to the allocation rule stored in the allocation rule storage 105; binding processors 109 to 115 that respectively have one of binding queues 1091 to 1151 storing messages allocated from the message allocation unit 103, and carries out a processing to bind the messages in the binding queue 1091 to 1151 for each transaction; and a data processor 117 that carries out a statistical processing for the bound messages received from the binding processors 109 to 115 and the like.

Incidentally, the configuration change unit 107 instructs the activation or stop (i.e. termination) for the binding processors 109 to 115. In addition, in FIG. 5, in order to represent that the binding processor 115 is now stopping, the binding processor 115 is depicted by using a dotted line.

In addition, the allocation rule storage 105 stores, for example, data representing how many binding processors operate and data representing which transaction is allocated to which allocation processor 109 to 115. For example, in a case where three allocation processors operate as depicted in an example of FIG. 5, the allocation rule storage 105 stores "3" and data representing correspondence after the change, between hash function values (e.g. residues) and IDs of the binding processors. The message allocation unit 103 divides the transaction ID of the received message by "3" and allocates the message to the binding processor 109 if the residue is "0", the binding processor 111 if the residue is "1" and the binding processor 113 if the residue is "2", for example. In addition, when activating the binding processor 115, the configuration change unit 107 stores "4" and data representing correspondence after the change, between hash function value (e.g. residues) and IDs of the binding processors, into the allocation rule storage 105. Thus, the message allocation unit 103 divides the transaction ID of the received message by "4" to identify a destination binding processor by the residue. Incidentally, such an allocation rule is a mere example, and other method can be adopted. Any general method can be adopted for the allocation rule in this embodiment.

In addition, the binding processors 109 to 115 are provided separately on different servers, for example. Furthermore, plural data processors 117 may be respectively provided for the respective binding processors 109 to 115, and a processor to aggregate the processing results of the respective data processors 117 may be additionally provided.

Next, processing contents of the message binding processing apparatus relating to this embodiment will be explained by using FIGS. 6 to 12. First, by using FIG. 6, a processing of the configuration change unit 107 in a case of adding the binding processor will be explained. When the configuration change unit 107 recognizes a time to add the binding processor according to an instruction of adding the binding processor from the user or according to the scheduling of the binding processors (step S1), the configuration change unit 107 identifies a binding processor (e.g. the binding processor 115) which should be added at this time, and activates the binding processor (step S3). Furthermore, the configuration change unit 107 changes data concerning the allocation rule stored in the allocation rule storage 105 to data after the change and registers the updated data into the allocation data storage 105 (step S5). That is, a setting to additionally allocate the message to the binding processor 115, which was activated at this time, is made.

Next, processing contents of the message allocation unit 103 will be explained by using FIGS. 7 and 8. When the message allocation unit 103 receives, from the message receiving unit 101, the message received by the message receiving unit 101, the message allocation unit 103 temporarily stores the received message into the allocation queue 1031. Although this is also described below, the message received from the binding processors 109 to 113 is also stored into the allocation queue 1031. Then, the message allocation unit 103 reads out one message from the allocation queue 1031 in an order of receiving the message (FIG. 7: step S11), and identifies one binding processor, which should process the read message, based on the data concerning the allocation rule, which is stored in the allocation rule storage 105, and the transaction ID included in the read message (step S13). This processing has been explained above. Then, the message allocation unit 103 outputs the read message to the identified binding processor (step S15). The processing of the steps S11 to S15 is repeated until a timing the processing is terminated (step S17).

Figure 7:
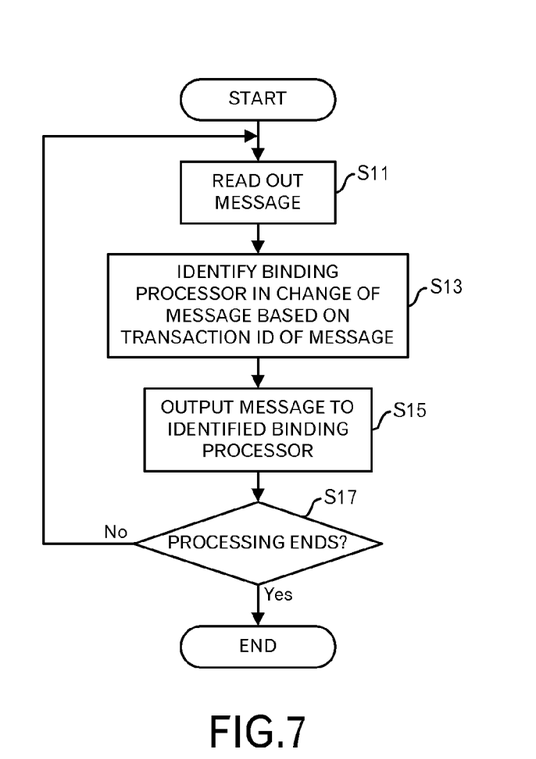
FIG. 7 is a diagram depicting a processing flow of a normal processing by a message allocation unit.
Figure 8:
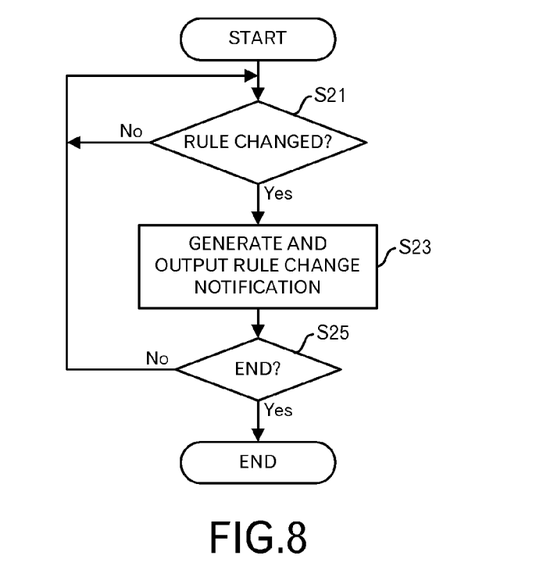
FIG. 8 is a diagram depicting a processing flow of a processing for a rule change notification by the message allocation unit.

While carrying out the processing depicted in FIG. 7, the message allocation unit 103 judges in another thread whether or not data concerning the allocation rule, which is stored in the allocation rule storage 105, is changed (step S21). When there is no change, the processing returns to the step S21, because the processing depicted in FIG. 7 is sufficient. On the other hand, when the data concerning the allocation rule is changed, the message allocation unit 103 generates a rule change notification, and outputs the rule change notification to all of the binding processors 109 to 113, which are now operating (step S23). Here, the rule change notification may simply notify the change, or may be a rule change notification including data concerning the allocation rule after the change. In the latter, the rule change notification includes, as the allocation rule after the change, data to identify which binding processor carries out the binding processing for which transactions. Such a processing is repeated until the processing is terminated (step S25).

Next, processing contents of the respective binding processors will be explained by using FIGS. 9 and 10. The binding processor 109 searches the binding queue 1091 to identify what messages are stored (step S31). Then, the binding processor 109 judges whether or not all of the messages belonging to a specific transaction have become complete (step S33). For example, when each transaction includes 6 messages a to f, the binding processor 109 judges whether or not 6 messages a to f are stored in the binding queue 1081 with respect to the same transaction. When the messages have not become complete with respect to any transaction in the binding queue 109, the processing returns to the step S31.

When all of the messages belonging to the specific transaction have become complete, the binding processor 109 outputs all messages belonging to the specific transaction to the data processor 117 (step S35). The steps S31 to S35 are repeated until the binding processor 109 stops its processing or the termination of the processing is instructed (step S37).

Figure 9:
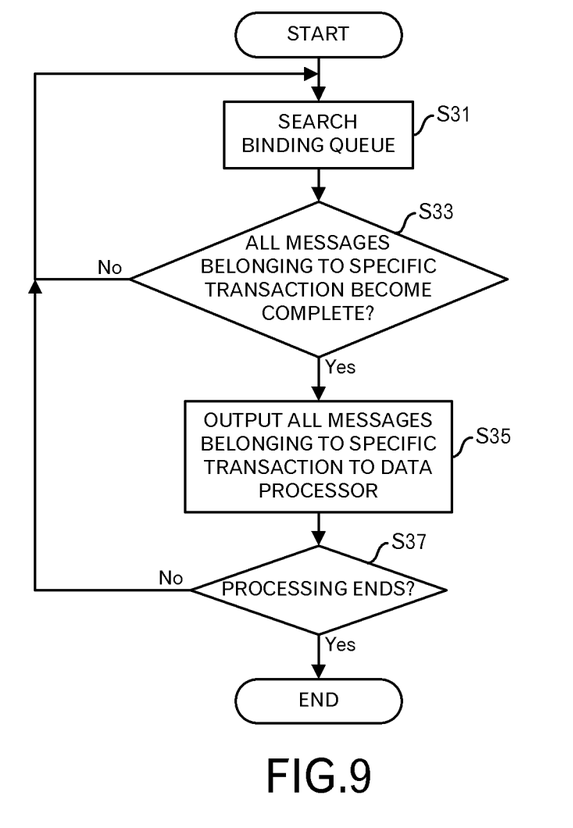
FIG. 9 is a diagram depicting a processing flow of a normal processing by the binding processor.
Figure 10:
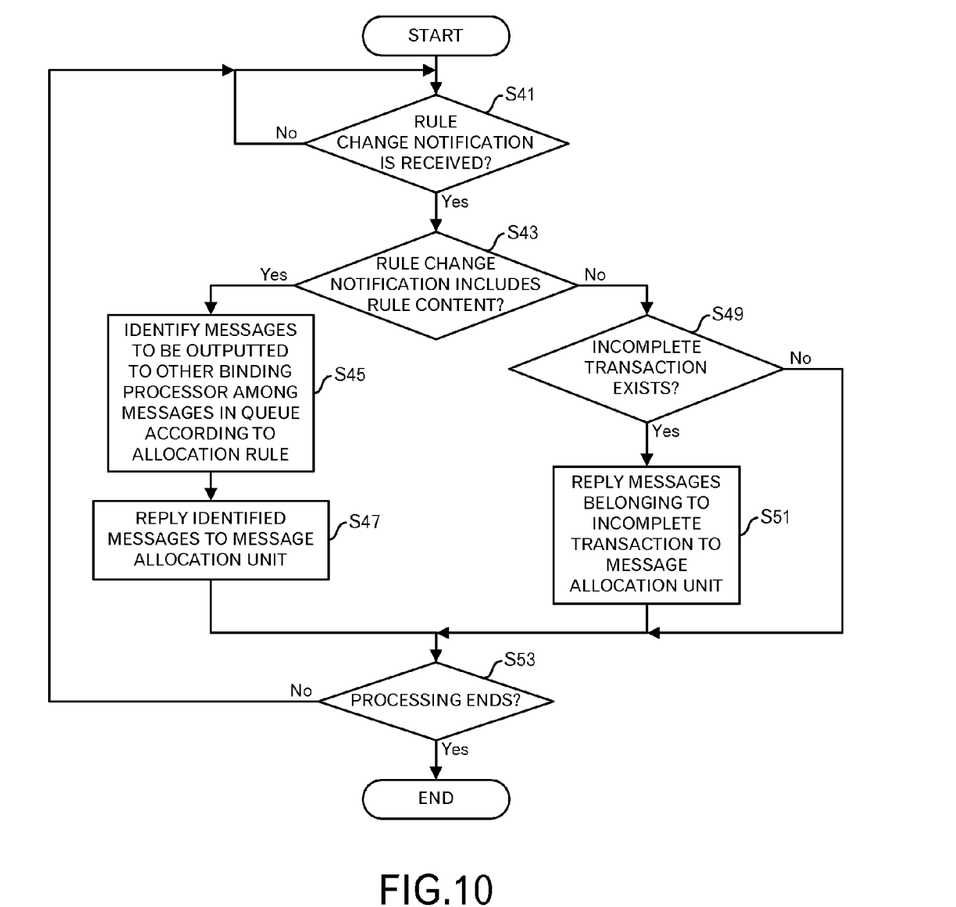
FIG. 10 is a diagram depicting a processing flow of a processing by the binding processor when the binding processor is added.

While carrying out the processing depicted in FIG. 9, the binding processor 109 judges in another thread whether or not the rule change notification is received (step S41). If the rule change notification is not received, the binding processor 109 waits for the receipt of the notification. On the other hand, when the rule change notification is received and the rule change notification does not include data concerning the allocation rule after the change (step S43: No route) the binding processor 109 searches the binding queue 1091 to judge whether or not any transaction (also called incomplete transaction) having incomplete messages exists in the binding queue 1091 (step S49). When there is no incomplete transaction, the processing shifts to step S53. On the other hand, when the incomplete transaction exists, the binding processor 109 reads out the messages belonging to the incomplete transaction from the binding queue 1091 and replies the read messages to the message allocation unit 103 (step S51). The message allocation unit 103 stores the received messages into the allocation queue 1031. Then, the processing shifts to the step S53.

When the rule change notification includes data concerning the allocation rule after the change (step S43: Yes route), the binding processor 109 identifies messages to be outputted to other binding processors based on the allocation rule after the change among the messages stored in the binding queue 1091 (step S45). For example, when a certain binding processor is in charge of the transactions whose transaction IDs are "3", "6", "9", "12", "15", . . . but it is judged according to the change of the allocation rule that the certain binding processor will be in charge of the transactions whose transaction IDs are "4", "8", "12", "16", . . . , the messages whose transaction IDs are other than "12" are identified, because other binding processors will be in charge of the messages whose transaction IDs are other than "12". Then, the binding processor 109 replies the identified messages to the message allocation unit 103 (step S47). By carrying out such a processing, the processing load of the message allocation unit 103 is lowered. The processing shifts to the step S53.

At the step S53, the binding processor 109 judges whether or not the processing should be terminated, and when the processing should not be terminated, the processing shifts to the step S41. On the other hand, when the processing should be terminated (e.g. in a case where the processing termination or stop is instructed), the processing is terminated.

By carrying out such a processing, even when the binding processor is added, the binding processing for the messages is carried out without leakage of the messages to be processed because the messages belonging to the incomplete transactions are allocated according to the allocation rule after the change to the binding processors newly responsible for those messages.

Figure 11:
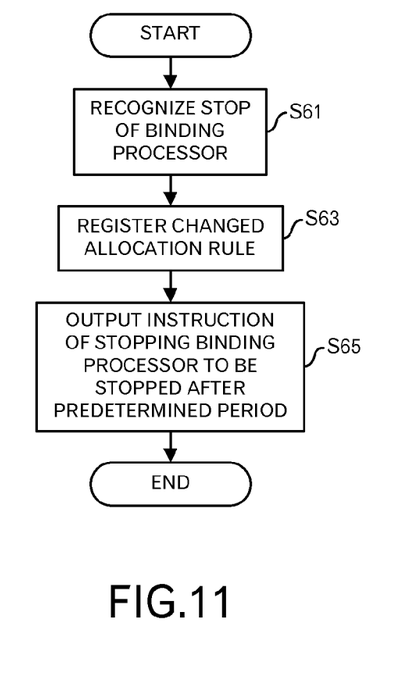
FIG. 11 is a diagram depicting a processing flow of a processing by the configuration change unit when the binding processor is stopped.
Figure 12:
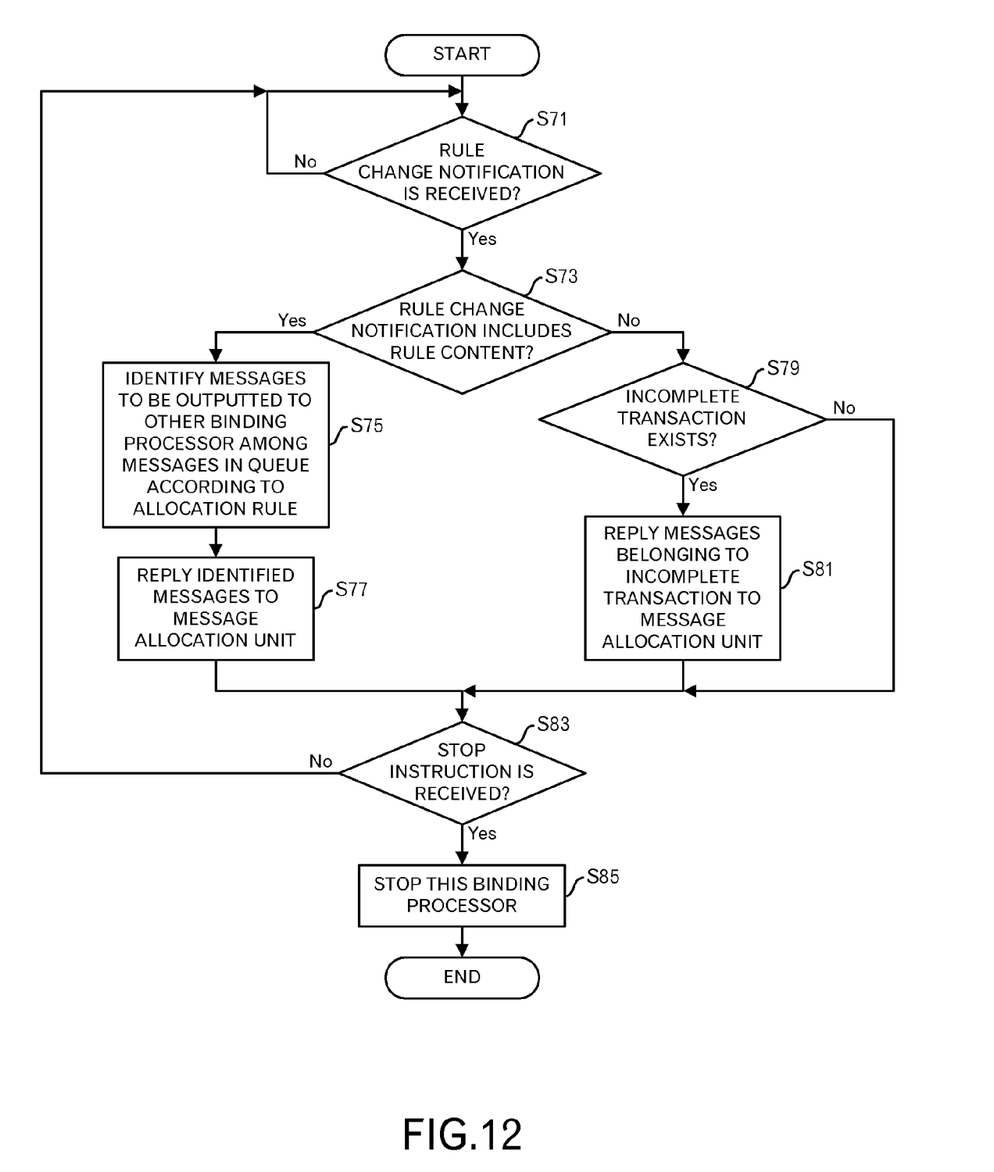
FIG. 12 is a diagram depicting a processing flow of a processing by the binding processor when the binding processor is stopped.

Next, a processing when a certain binding processor stops will be explained by using FIGS. 11 and 12. The configuration change unit 107 carries out a processing as depicted in FIG. 11 when the certain binding processor stops.

When the configuration change unit 107 recognizes a time to stop the specific binding processor according to an instruction of stopping a specific binding processor from the user or according to the scheduling of the binding processors by the user (step S61), the configuration change unit 107 identifies the binding processor to be stopped (e.g. the binding processor 115), updates data concerning the allocation rule, which is stored in the allocation rule storage 105, and stores the updated data concerning the allocation rule after the change into the allocation rule storage 105 (step S63). That is, such a setting that the message allocation to the binding processor 115 is stopped is made. Then, after a predetermined time, the configuration change unit 107 outputs a stop instruction to the binding processor 115 to be stopped (step S65). The predetermined time longer than a time necessary to complete the processing to reply the messages from the respective binding processors to the message allocation unit 103 is set. However, a notification to notify the configuration change unit 107 of the completion of the message reply may be received from the respective binding processors, and then, the configuration change unit 107 may stop the pertinent binding processor.

The message allocation unit 103 carries out the same processing even when the binding processor is stopped or added.

Next, processing contents of the respective binding processors at the stop of the binding processor will be explained by using FIG. 12. The binding processor 109 judges whether or not the rule change notification is received (step S71). When the rule change notification is not received, the binding processor 109 waits for the notification. On the other hand, when the rule change notification is received and the rule change notification includes data concerning the allocation rule after the change (step S73: No route), the binding processor 109 searches the binding queue 1091 to judges whether or not the incomplete transaction exists (step S79). When the incomplete transaction does not exist, the processing shifts to step S83. On the other hand, when the incomplete transaction exists, the binding processor 109 reads out messages belonging to the incomplete transaction, and replies the read messages to the message allocation unit 103 (step S81). The message allocation unit 103 stores the received messages to the allocation queue 1031. Then, the processor shifts to the step S83.

When the rule change notification includes data concerning the allocation rule after the change (step S73: Yes route), the binding processor 109 identifies messages to be outputted to other binding processors based on the allocation rule after the change among the messages stored in the binding queue 1091 (step S75). For example, even when the binding processor 109 is in charge of the messages whose transaction IDs are "3", "6", "9", "12", "15", . . . , the binding processor 109, which will be stopped, will not have any transaction to be handled, according to the change of the allocation rule. In such a case, all messages are identified as messages to be replied. Then, the binding processor 109 replies the identified messages to the message allocation unit 103 (step S77). By carrying out such a processing, the processing load of the message allocation unit 103 is reduced. The processing shifts to the step S83.

Then, the binding processor 109 judges whether or not the stop instruction from the configuration change unit 107 was received from the configuration change unit 107 within a predetermined time from receipt of the rule change notification (step S83). When the stop instruction is not received, the processing returns to the step S71. On the other hand, when the stop instruction is received from the configuration change unit 107, the binding processor 109 stops (step S83).

By carrying out such a processing, it becomes possible to carry out the binding processing of the message without the leakage of the messages to be analyzed, even when the binding processor is stopped.

Although the embodiments are explained above, this technique is not limited to these embodiments. For example, the processing order in the processing flow can be exchanged as long as the processing results are not changed. In addition, the configuration depicted in FIG. 5 is realized by plural computers. However, it is arbitrary which configuration element is implemented in which computer. For example, plural binding processors may be activated in one computer.

The embodiments are summarized as follows. A message binding processing apparatus has a receipt unit that receives a plurality of messages, which belong to a plurality of transactions and respectively have a pertinent transaction identifier, in an indefinite order; a plurality of binding processing units each having a queue storing the messages belonging to transactions in charge, and each outputting, after the messages belonging to one of the transactions in charge have become complete, the complete messages in the queue to a message processing unit; a message allocation unit that outputs the received message to one of the plurality of binding processing units, wherein one of the binding processors is identified based on the transaction identifier of the received message and an allocation rule predetermined for the transaction identifier; and a configuration change unit that changes the allocation rule when activating or stopping the binding processing unit. Then, when the configuration change unit changes the allocation rule, each of the binding processing units outputs at least messages for which re-allocation is necessary among the messages stored in the queue to the message allocation unit.

Thus, even when the allocation rule is changed and the binding processing unit of the allocation destination is changed, the messages are allocated again by the message allocation unit. Hence, it becomes possible to carry out the binding processing without leakage of the messages to be analyzed.

Incidentally, when the configuration change unit changes the allocation rule, the message allocation unit, which detects the change of the allocation rule, may output a change notification to the respective binding processing units. On the other hand, the configuration change unit may output the change notification to the respective binding processing unit. In the former, when receiving the change notification, the respective binding processing units output messages stored in the queue to the message allocation unit. Thus, the messages are re-allocated to the binding processing units, which are newly in charge of the messages, without the leakage of the messages.

In addition, when the configuration change unit changes the allocation rule, the message allocation unit, which detects the change of the allocation unit, may output a change notification including data concerning the allocation rule after the change, to the respective binding processing units. In such a case, when receiving the change notification, the respective binding processing units identifies messages to be allocated to other binding processing units according to the data concerning the allocation rule after the change, which is included in the change notification, and outputs the identified messages to the message allocation unit. Thus, the number of messages to be replied to the message allocation unit can be reduced, and the load of the message allocation unit can also be reduced.

Furthermore, when a specific binding processing unit is stopped, the configuration change unit may instruct the specific binding processing unit to stop after the respective binding processing unit outputs the messages to the message allocation unit. This is to ensure that the message allocation processing is carried out again.

Incidentally, it is possible to create a program causing a computer to execute the aforementioned method, and such a program is stores in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

Figure 13:
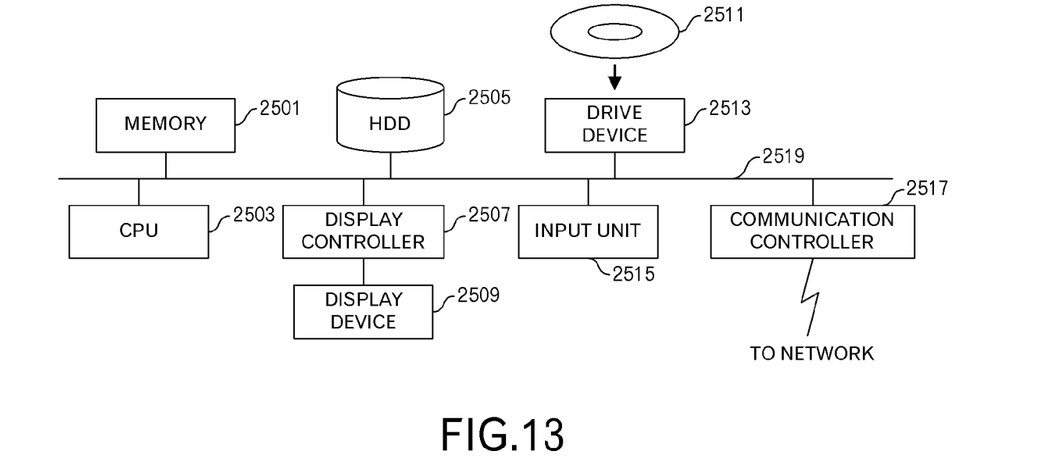
FIG. 13 is a functional block diagram of a computer.

Incidentally, computers used in the constitution depicted in FIG. 5 are computer devices as shown in FIG. 13. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 13. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A message binding processing apparatus, comprising:
a memory; and
a processor configured to execute a process, the process comprising:
receiving a plurality of messages each of which belongs to a transaction among a plurality of transactions and has a transaction identifier;
identifying, based on a transaction identifier of a received message and an allocation rule for the transaction identifier, a binding processing unit among a plurality of binding processing units, wherein each of the plurality of binding processing units is in charge of at least one transaction, includes a queue, configured on the memory, for storing the messages belonging to a transaction in charge, determines whether messages belonging to one transaction are complete in the queue, and outputs the messages belonging to the one transaction to a message processing unit when it is determined that the messages belonging to the one transaction are complete;
outputting the message received in the receiving to the identified binding processing unit;
upon detection of activating a binding processing unit, changing the allocation rule so as to allocate a new message to the activated binding processing unit, and upon stopping a binding processing unit, changing the allocation rule so as to stop an output of a new message to the stopped binding processing unit;
upon the changing, causing each of the plurality of binding processing units to output at least messages for which re-allocation is necessary among the messages stored in the queue;
upon receiving the outputted messages, identifying, for each of the retrieved messages, one of the binding processing units, based on the transaction identifier of the outputted message and the changed allocation rule; and
outputting each of the outputted messages to the binding processing unit identified for the outputted message.

2. The message binding processing apparatus as set forth in claim 1, wherein the causing comprises outputting a change notification to each of the plurality of binding processing units, and
when receiving the change notification, each of the plurality of binding processing units outputs the messages stored in the queue.

3. The message binding processing apparatus as set forth in claim 1, wherein the causing comprises outputting a change notification including data concerning the allocation rule after the change, to each of the plurality of binding processing units, and
when receiving the change notification, each of the plurality of binding processing units identifies messages to be allocated to other binding processing units according to the data concerning the allocation rule after the change, which is included in the change notification, and outputs the identified messages.

4. The message binding processing apparatus as set forth in claim 1, wherein the process further comprises upon detecting that a specific binding processing unit is stopped, instructing the specific binding processing unit to stop after each of the plurality of binding processing units outputs the messages.

5. A computer-implemented message binding processing method, comprising:

receiving a plurality of messages each of which belongs to a transaction among a plurality of transactions and has a transaction identifier;

identifying, based on a transaction identifier of a received message and an allocation rule for the transaction identifier and by a processor, a binding processing unit among a plurality of binding processing units, wherein each of the plurality of binding processing units includes a queue for storing the messages belonging to a transaction in charge, determines whether messages belonging to one transaction are complete in the queue, and outputs the messages belonging to the one transaction to a message processing unit when it is determined that the messages belonging to the one transaction are complete;

outputting the received message to the identified binding processing unit;

changing, upon detection of activating the binding processing unit, the allocation rule so as to allocate a new message to the activated binding processing unit, and upon stopping the binding processing unit, the allocation rule so as to stop an output of a new message to the stopped binding unit;

upon the changing, retrieving at least messages for which re-allocation is necessary among the messages stored in the queue from the plurality of binding processing units;

identifying, for each of the retrieved messages, one of the binding processing units, based on the transaction identifier of the retrieved message and the changed allocation rule; and outputting each of the retrieved messages to the binding processing unit identified for the retrieved message.

* * * * *